(12) United States Patent
Guan et al.

(10) Patent No.: US 6,317,250 B1
(45) Date of Patent: Nov. 13, 2001

(54) OPTICAL ISOLATOR USING MULTIPLE CORE FIBERS

(75) Inventors: Kejian Guan, San Jose; Kok Wai Chang, Sunnyvale, both of CA (US)

(73) Assignee: E-Tek Dynamics, Inc., San Jose, CA (US)

( * ) Notice: Subject to any disclaimer, the term of this patent is extended or adjusted under 35 U.S.C. 154(b) by 0 days.

(21) Appl. No.: 09/660,314

(22) Filed: Sep. 12, 2000

(51) Int. Cl.[7] .................................. G02F 1/09; G02B 6/02
(52) U.S. Cl. ................. 359/280; 359/281; 359/282; 359/256; 359/324; 359/484; 385/126; 385/47; 385/11; 324/96; 324/244.1
(58) Field of Search .................................... 359/280, 281, 359/282, 284, 256, 324, 484, 495, 496, 497; 385/11, 15, 126, 22, 47; 324/244.1, 96

(56) References Cited

U.S. PATENT DOCUMENTS

| | | | |
|---|---|---|---|
| 5,381,261 | 1/1995 | Hirai et al. | 359/282 |
| 5,557,692 | 9/1996 | Pan et al. | 385/11 |
| 5,774,264 | 6/1998 | Konno et al. | 359/497 |
| 5,930,039 | * 7/1999 | Li et al. | 359/484 |
| 5,936,768 | * 8/1999 | Oguma | 359/484 |
| 5,982,539 | * 11/1999 | Shirasaki | 359/484 |
| 6,061,167 | * 5/2000 | Song | 359/256 |
| 6,075,642 | * 6/2000 | Chang | 359/281 |
| 6,097,869 | * 8/2000 | Chang et al. | 385/126 |
| 6,154,581 | * 11/2000 | Lu et al. | 385/11 |
| 6,167,174 | * 12/2000 | Zhang et al. | 359/256 |

* cited by examiner

*Primary Examiner*—Loha Ben
(74) *Attorney, Agent, or Firm*—Lacasse & Associates; Randy W. Lacasse; Kevin E. Greene (57) ABSTRACT

A method and apparatus for optically isolating multiple core optical fibers while at the same time substantially reducing polarization mode dispersion, is disclosed. A multiple core fiber is optically coupled to optical birefringent elements, reciprocal and non-reciprocal rotators, and through a lens assembly to a multiple core optical fiber output.

35 Claims, 11 Drawing Sheets

OPTICAL ISOLATOR USING MULTIPLE CORE FIBERS

FIELD OF THE INVENTION

The present invention pertains to the field of fiber optics, more particularly, the present invention relates to optical isolators using multiple core fibers.

BACKGROUND OF THE INVENTION

The field of fiber optics is currently undergoing rapid growth. A good portion of this rapid growth is driven by the desire to provide larger bandwidth capability to communication systems. Many approaches have been utilized to increase the existing communication system's current infrastructure. Improvements in amplifiers, encoding and decoding techniques, as well as others, has had some success. Of technologies currently available, optical fibers hold great promise for increasing available bandwidth. Thus, optical components that are able to assist in attaining increased bandwidth are of interest.

One of the optical components that is of value is an optical isolator. By providing the ability to transfer light in essentially one direction only, the optical isolator may "shield" those components whose performance suffers from light traveling in a reverse direction. Devices such as optical amplifiers, lasers, and other components suffer performance degradation from light entering in a "reverse" direction.

Figure 1:
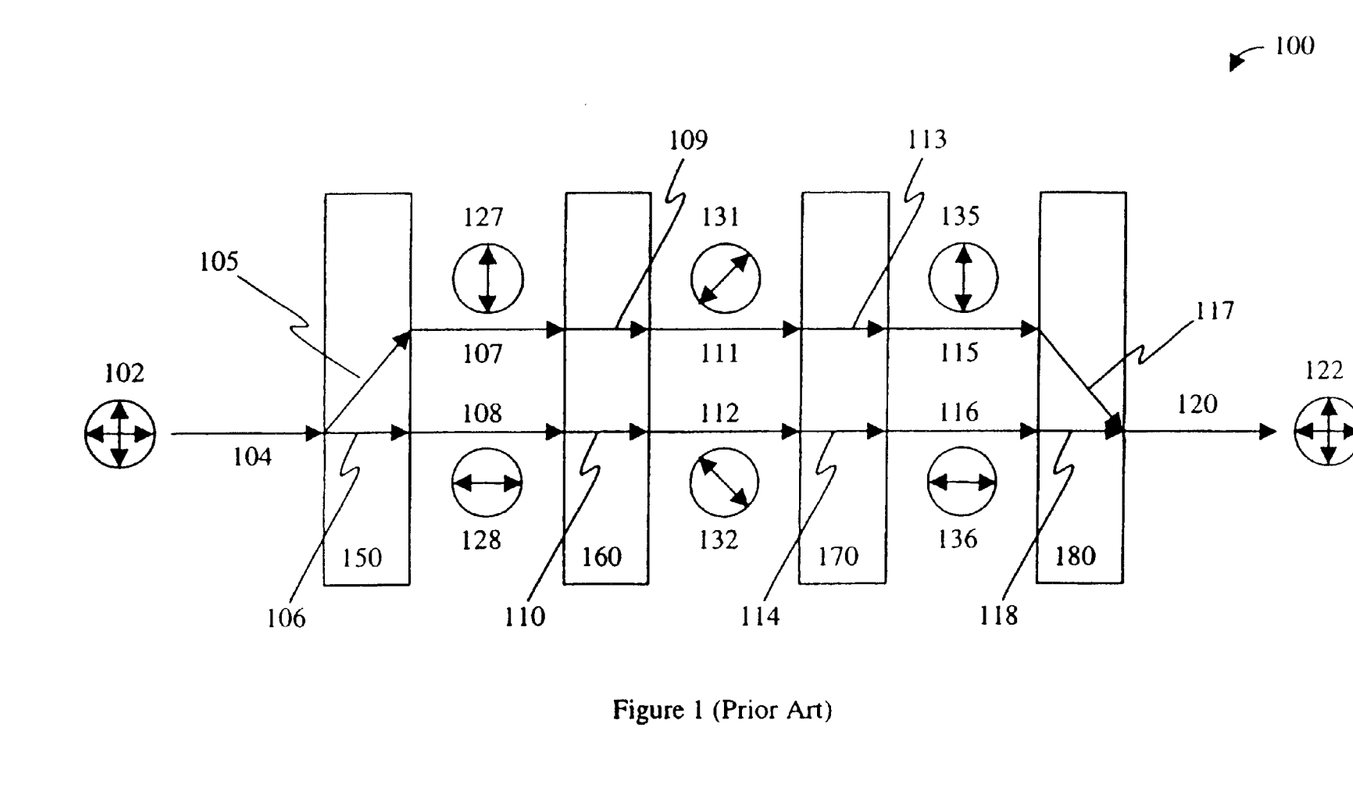
FIG. 1 illustrates spatial and optical operations for a prior art single fiber optical isolator.

One prior optical isolator provides single fiber optical isolation. However, such an approach also introduces polarization mode dispersion because of the differing optical paths. These differences in optical path length may be due to such factors as differences in refractive indices, and differences in physical paths. For example, FIG. 1 illustrates an optical isolator 100, in which differing optical paths for different polarizations introduces polarization mode dispersion. In this prior art, incoming light and exiting light are coaxial. Incoming light 104 has random polarization as illustrated by horizontal and vertical components 102. The incoming light 104 upon entering a birefringent crystal 150 travels different paths depending upon polarization. Path 106 is the path for the horizontally polarized component of the incoming light 104, while path 105 is the path for the vertically polarized component of the incoming light 104. The horizontally polarized component of the incoming light 104 upon exiting the birefringent crystal 150 continues 108 traveling through 110 the Faraday rotator 160, then 112 through 114 a half wave plate 170, then 116 through 118 a second birefringent crystal 180, and exiting 120. The vertically polarized component of incoming light 104 upon exiting the birefringent crystal 150 continues 107 traveling through 109 the Faraday rotator 160, then 111 through 113 a half wave plate 170, then 115 through 117 a second birefringent crystal 180, and exiting 120.

The optical path length for the horizontally polarized component of the incoming light 104, in this example, is shorter than the optical path length for the vertically polarized component of the incoming light 104. It is this difference that contributes to the polarization mode dispersion. That is, incoming light 104 may have vertical and horizontal polarization components that are coincident with respect to each other upon entering the isolator 100, however upon exiting the isolator 100, the horizontally polarized component of the incoming light 104, in this example, travels a shorter distance than the vertically polarized component of the incoming light 104 and so the horizontally polarized component of the incoming light 104 will exit the optical isolator 100 before the vertically polarized component of the incoming light 104 with which it was initially coincident. Because of this spreading, signals must be spaced further apart in order to resolve them. This results in less than optimum information capacity.

Figure 2:
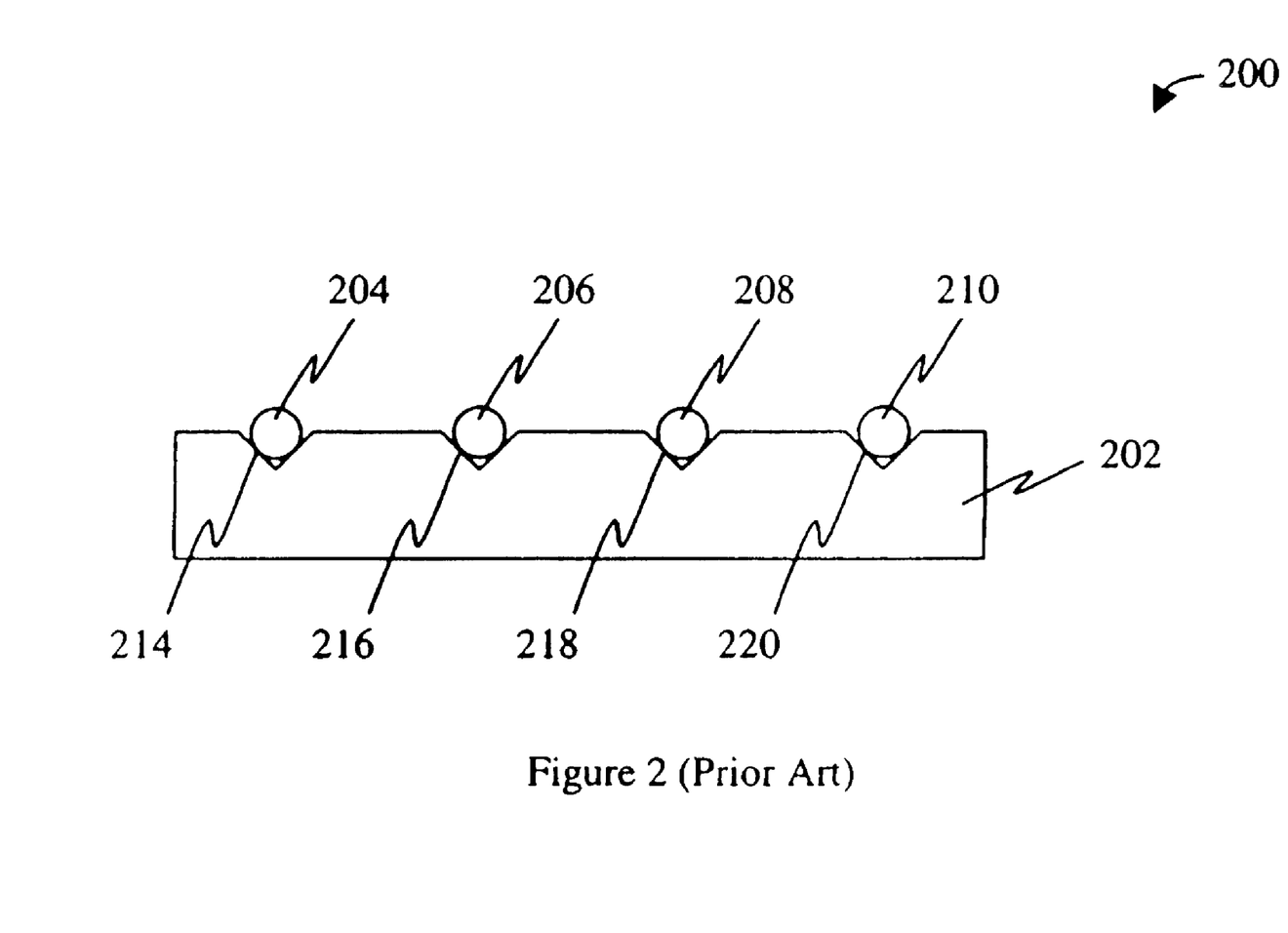
FIG. 2 illustrates a prior art V-groove assembly.

Another prior single fiber optical isolator solution concentrates on lowering polarization mode dispersion. Yet, other optical isolators use components that try to address the assembly of thermally expanded core fibers via the use of V-groove techniques. FIG. 2 illustrates a V-groove assembly 200 in which individual fibers 204, 206, 208, and 210 are positioned within V-shaped grooves 214, 216, 218 and 220 respectively that are fabricated on a substrate 202. V-groove assemblies require steps to place and secure the individual fibers within the V-grooves. Additionally the pitch between the fibers is currently in the 250 μm range. The alignment of an input V-groove assembly with other optical components and then with an output V-groove assembly presents challenges.

The prior art discloses single fiber optical isolators that may suffer from the introduction of polarization mode dispersion and multiple core assemblies that may suffer from assembly difficulties.

SUMMARY OF THE INVENTION

An apparatus for optically isolating multiple core optical fibers is disclosed. Two multiple core fibers are coupled to an optical isolator.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings and in which:

FIG. 7a illustrates an alternate representation of the operations portrayed in FIG. 6a;

DETAILED DESCRIPTION

A method and apparatus for optically isolating multiple core fibers is described. What the method and apparatus disclosed herein include, among other things, is the use of a multiple core fiber for input and output signals. For the purposes of discussion, reference will be made to a multiple core fiber or a multi-core fiber, which is understood to carry a plurality of optical signals, each in a respective core. Thus, reference to a signal, in the singular, is to be understood with respect to the multiple core fiber and each and every respective signal within a core, and thus encompasses a multitude of signals. Likewise, the use of the word "coupled," or its variation, is to be understood in the context of optics to refer to optical coupling.

In one embodiment, an input multiple core fiber is optically coupled to a walk-off element, in the form of a birefringent crystal. A received optical signal from the input multiple core fiber is propagated through the birefringent crystal, which separates the received optical signal from the input multiple core fiber into two orthogonally related optical signals. The orthogonally related optical signals received from the birefringent crystal are then coupled to optical components capable of performing reciprocal and non-reciprocal rotations on the optical signals emerging from the birefringent crystal. These rotations may be in any sequence, i.e. reciprocal rotation may be followed by non-reciprocal rotation, or vice versa. Following the rotations, the optical signals are recombined by use of another walk-off element, again in the form of a second birefringent crystal. The recombined optical signal from the second walk-off element is then optically coupled to a lens system, often a gradient index lens system, and finally to the multiple core output fiber.

Figure 3:
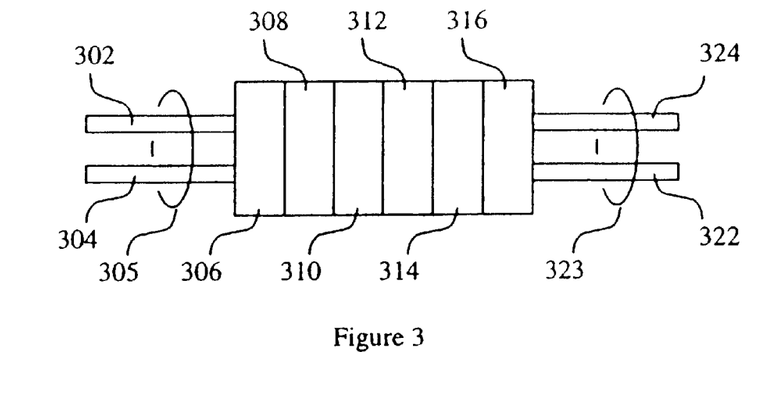
FIG. 3 illustrates one embodiment of a twin core isolator.

FIG. 3 illustrates one embodiment of a twin core isolator. The input multiple core fiber 305 has two cores 302 and 304. Input cores 302 and 304, are optically coupled to a first walk-off element 306. In one embodiment the function performed by the walk-off element 306 of spatially separating the input beam into two orthogonally related beams may be performed by a polarizing beamsplitter. In an alternative embodiment, walk-off element 306 may be constructed of another material, for example, calcite a birefringent crystal. The walk-off element 306 is coupled to a Faraday rotator 308. A Faraday rotator is a non-reciprocal rotator, meaning that it rotates light in the same direction regardless of the light's direction of travel. A Faraday rotator may be created from a latched garnet crystal. The Faraday rotator 308 is coupled to a waveplate 310 for rotation. The waveplate 310 is often a half-wave plate, which may be used to rotate the polarized light to another predetermined angle. The waveplate 310 is coupled to a second walk-off element 312. The second walk-off element 312 is often a birefringent crystal. The second walk-off element 312 is coupled to a first lens 314. This first lens 314 may be a gradient index lens. A gradient index lens may have plane end surfaces and a continuous refractive index that varies with radial position. The first lens 314 output is coupled to a second lens 316. This second lens 316 may be a gradient index lens. The output of this second lens 316 is coupled into the output multiple core fiber 323, which has two cores 322 and 324.

In the alternative embodiment, the optical isolator shown in FIG. 3 would still function if the relative positions of the Faraday rotator 308, and waveplate 310 were transposed in position such that light coming from the input multiple core fiber 305 were to pass through a walk-off element 306, a waveplate, a Faraday rotator, and then continue through a second walk-off element 312, lens 314 and lens 316 and to the output multiple core fiber 323. Similarly, FIG. 3, does not show optic elements that are not active in the operation of the isolator. For example, the spacing between the lenses 314 and 316, for maximum coupling of the signal to the output multiple core fiber, requires that they be substantially at a distance of twice the focal length of either lens. This is not shown in FIG. 3, nor is the possibility that this distance may be maintained by a "spacer". This spacer may be a separating ring of material or a non-active optical element or some other device for maintaining this separation.

In order to reduce polarization mode dispersion, while not explicitly shown in FIG. 3, it is to be understood that the optical path length of a signal received from core 302 to the output signal emerging from lens 316 is substantially equidistant regardless of polarization. In order to reduce polarization mode dispersion, while not explicitly shown in FIG. 3, it is to be understood that the optical path length of a signal received from core 304 to the output signal emerging from lens 316 is substantially equidistant regardless of polarization.

The use of an input multiple core fiber 305 illustrated in FIG. 3 as having two cores 302 and 304 may reduce the size of the optical isolator. For example, using a thermally expanded multiple core fiber or a thermally expanded twin core fiber, allows the core to core spacing, for example from the center of core 302 to the center of core 304 to be in the range of 62.5 μm. This may allow a reduction in the size of other optical components and a resultant decrease in the overall size of the optical isolator. The use of an output multiple core fiber 323 illustrated in FIG. 3 as having two cores 322 and 324 may reduce the size of the optical isolator. For example, using a thermally expanded multiple core fiber or a thermally expanded twin core fiber, allows the core to core spacing, for example from the center of core 322 to the center of core 324 to be in the range of 62.5 μm. This may allow a reduction in the size of other optical components and a resultant decrease in the overall size of the optical isolator. In one embodiment, a single stage optical isolator, such as that described above and illustrated in FIG. 3, may be expected to provide 20 to 30 decibels of optical isolation.

Figure 4:
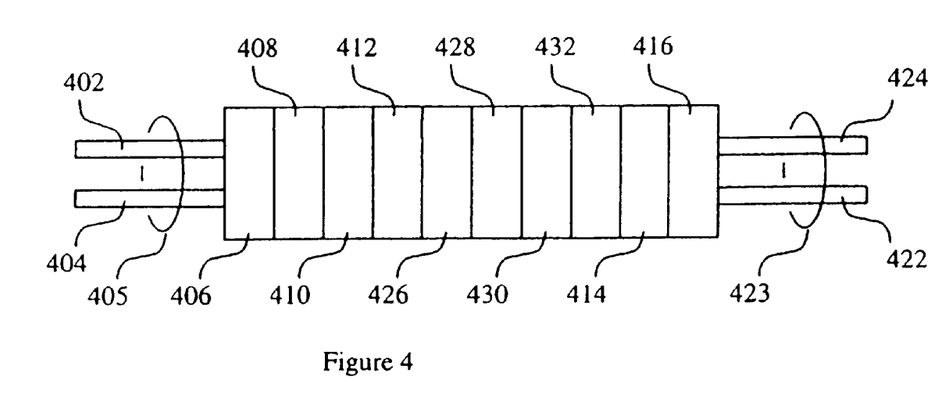
FIG. 4 illustrates one embodiment of a two stage twin core isolator.

FIG. 4 illustrates one embodiment of a two stage twin core isolator. The optical components (walk-off element, Faraday rotator, waveplate, lens, etc.) and their characteristics are described above and will not be repeated here. The first stage of optical isolation includes a walk-off element 406, a Faraday rotator 408, a waveplate 410, and a walk-off element 412. The second stage of optical isolation includes a walk-off element 426, a Faraday rotator 428, a waveplate 430, and a walk-off element 432. Optical inputs 402 and 404, from the multiple core fiber 405 are optically coupled to a first walk-off element 406. This walk-off element may be a birefringent crystal as explained above. The walk-off element 406 is coupled to a Faraday rotator 408, which is then coupled to a waveplate 410, which is then coupled to a second walk-off element 412. The optical signals emerging from the second walk-off element 412 are coupled to a third walk-off element 426, which is then coupled to a Faraday rotator 428, which is then coupled to a second waveplate 430, which is then coupled to a fourth walk-off element 432, which is then coupled to a lens system comprised of lens 414 and 416, which couples the optical signal to the output multiple core fiber 423 and cores 424 and 422. To reduce the amount of light leakage in the reverse direction, the optical axes of the first stage is often not aligned with the optical axes of the second stage. In other words, if the walk-off element 406 has an optical vertical axis at +45 degrees, then the optical vertical axis of walk-off element 426 may be aligned, for example, at −45 degrees.

FIG. 4, necessarily is a block diagram, and as such, it is to be understood to show only the representative positions of optical elements, rather than absolute positions. For example, the two stage optical isolator shown in FIG. 4 would still function if the relative positions of the Faraday rotator 408 and waveplate 410 were transposed in position. Similarly, Faraday rotator 428 and waveplate 430 may be transposed and the isolator will still function. FIG. 4 does not show optic elements that are not active in the operation of the isolator. For example, the spacing between the lenses 414 and 416, for maximum coupling of the signal to the output multiple core fiber 423, requires that they be substantially at a distance of twice the focal length of either lens. This is not shown in FIG. 4, nor is the possibility that this distance may be maintained by a spacer ring, a non-active optical element or some other device for maintaining this separation.

In order to reduce polarization mode dispersion, while not explicitly shown in FIG. 4, it is to be understood that the optical path length of a signal received from core 402 to the output signal emerging from lens 416 is substantially equidistant regardless of polarization. In order to reduce polarization mode dispersion, while not explicitly shown in FIG. 4, it is to be understood that the optical path length of a signal received from core 404 to the output signal emerging from lens 416 is substantially equidistant regardless of polarization.

The use of an input multiple core fiber 405 illustrated in FIG. 4 as having two cores 402 and 404 may reduce the size of the optical isolator. For example, using a thermally expanded multiple core fiber or a thermally expanded twin core fiber, allows the core to core spacing, for example from the center of core 402 to the center of core 404 to be in the range of 62.5 µm. This may allow a reduction in the size of other optical components and a resultant decrease in the overall size of the optical isolator. The use of an output multiple core fiber 423 illustrated in FIG. 4 as having two cores 422 and 424 may reduce the size of the optical isolator. For example, using a thermally expanded multiple core fiber or a thermally expanded twin core fiber, allows the core to core spacing, for example from the center of core 422 to the center of core 424 to be in the range of 62.5 µm. This may allow a reduction in the size of other optical components and a resultant decrease in the overall size of the optical isolator. In one embodiment, a two stage twin core isolator, such as that described above and illustrated in FIG. 4, may be expected to provide from 40 to 60 decibels of optical isolation.

Figure 5:
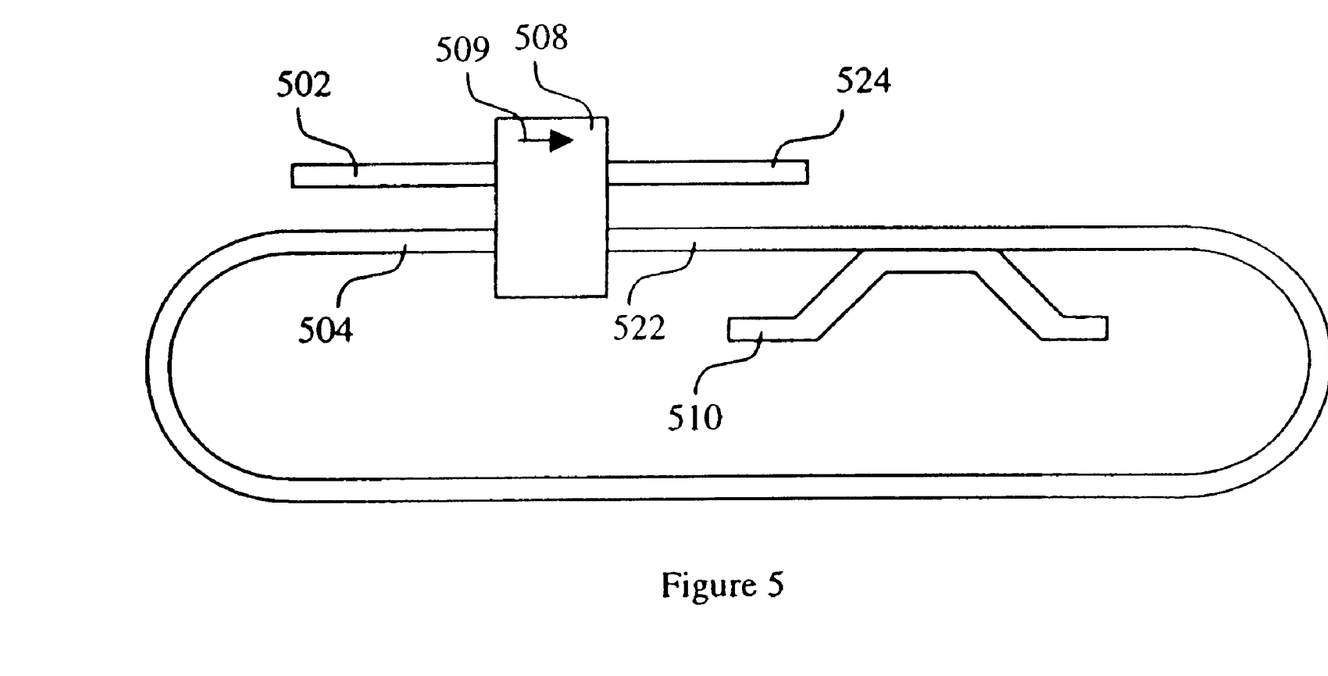
FIG. 5 illustrates one embodiment of a twin isolator used in an optical amplifier application.

FIG. 5 is an illustration of the use of a twin core optical isolator 508 in an optical amplifier application example. Here, an erbium-doped fiber amplifier includes an erbium-doped fiber 522 and an optical pump 510. Operationally, an optical input 502 is coupled to the twin core optical isolator 508, with the arrow 509 denoting the preferential direction of light travel, and the optically isolated output coupled to the erbium-doped fiber 522. The optical pump 510 in combination with the erbium-doped fiber 522 results in optical amplification of a signal, which is then routed to a second input 504 of the twin core optical isolator 508 and presented on output 524. The twin core optical isolator 508 may be a single stage or multiple stage isolator.

Figure 6A:
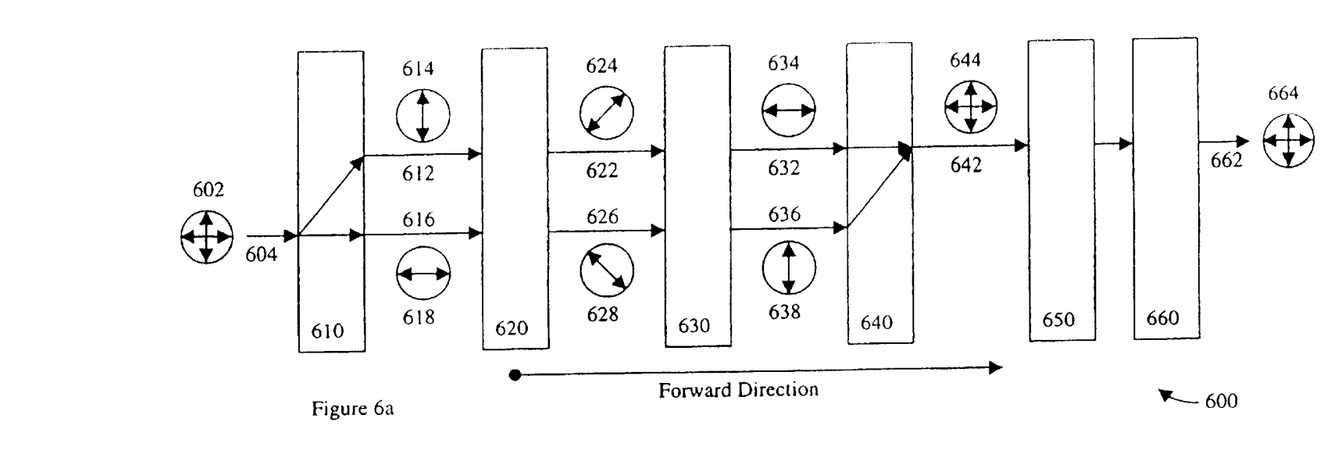
FIG. 6a illustrates spatial and optical operations for one embodiment of a single fiber optical isolator with light moving in the forward direction.
Figure 6B:
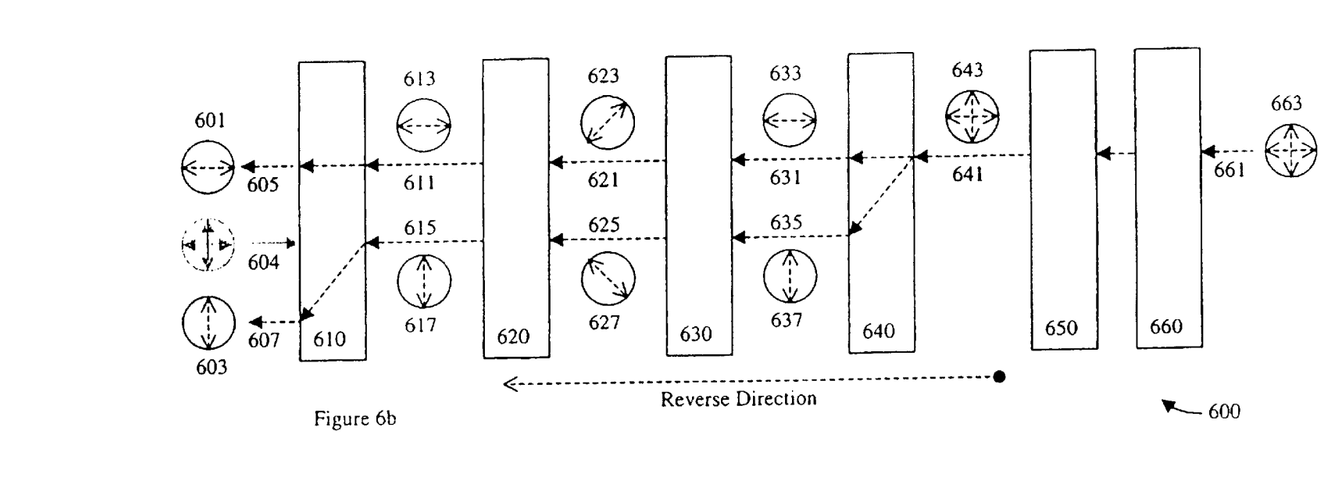
FIG. 6b illustrates spatial and optical operations for one embodiment of a single fiber optical isolator with light moving in the reverse direction.

FIG. 6 illustrates the spatial and optical operations performed for a single fiber input/output with light traveling in the forward direction (FIG. 6a), and the reverse direction (FIG. 6b). It is to be understood that for illustrative purposes, the optical components are shown physically separated in FIG. 6.

FIG. 6a shows the major optical components of the isolator 600, as a first walk-off element 610, a Faraday rotator 620, a waveplate 630, a second walk-off element 640, a first lens 650, and a second lens 660. Light from an optical fiber is represented by the labeled arrow 604 and represents light moving from left to right. The state of the polarization of the light represented by the labeled arrow 604 is shown in the circle 602 as having a horizontal and vertical component. The entering light 604 is unpolarized. Light 604 upon traversing the walk-off element 610 is split into two beams. One beam 616 has a horizontal polarization 618. The other beam 612 has a vertical polarization 614. Faraday rotator 620 is illustrated, in this example, as rotating light 45 degrees clockwise. Hence, vertically polarized beam 612 entering the Faraday rotator 620 and traversing the Faraday rotator 620 is rotated 45 degrees as shown as beam 622 with the polarization 624 as shown. Likewise, the horizontally polarized beam 616 in traversing the Faraday rotator 620 has been rotated 45 degrees as shown as beam 626 with the polarization 628 as shown. Waveplate 630 in this illustration rotates entering light beams 622 and 626 clockwise 45 degrees. So upon exiting the waveplate 630, entering light beam 622 is now a horizontally polarized 634 light beam 632, and entering light 626 is now a vertically polarized 638 light bean 636. Light beams 632 and 636 upon traversing the walk-off element 640 are combined into one beam 642 with substantially the same unpolarized 644 characteristics as the incoming light at 604 with polarization 602.

In this example the walk-off distance of the first walk-off element and the walk-off distance of the second walk-off element are substantially equal thus reducing polarization mode dispersion. The light beam 642 passes through lenses 650 and 660 which focus the received light beam 642 so that beam 662 may be coupled to an output optical cable. Beam 662 with a polarization of 664 is essentially a focused version of light beam 642 with a polarization of 644, and is essentially identical, except for minor losses, to the input light 604 with a polarization 602. Note that in this example, that the optical input path, essentially at the height of the 604 arrow, and the output optical path, essentially at the height of the 662 arrow are physically separated by a vertical distance such that the input and output axes are not coaxial. However, the optical path lengths of the two beams are essentially identical. That is, the first path length from the entry point of light 604 at walk-off element 610 through walk-off element 610, along the path as indicated for beam 616, through Faraday rotator 620, along the path as indicated for beam 626, through waveplate 630, along the path as indicated for beam 636, through walk-off element 640, exiting out of walk-off element 640 at exit point as indicated for beam 642, is substantially the same as the second path from the entry point of light 604 at walk-off element 610 through walk-off element 610, along the path as indicated for beam 612, through Faraday rotator 620, along the path as indicated for beam 622, through waveplate 630, along the path as indicated for beam 632, through walk-off element 640, and out walk-off element 640 at exit point as indicated for beam 642. Because the paths are substantially of equal distance the isolator is essentially polarization mode dispersion free.

FIG. 6b illustrates the operation of the optical isolator 600, from the perspective of light traveling in the reverse direction (i.e. right to left in FIG. 6b). FIG. 6b shows the major optical components of the isolator 600, as a first walk-off element 610, a Faraday rotator 620, a waveplate 630, a second walk-off element 640, a first lens 650, and a second lens 660. Because the first walk-off element 610, the waveplate 630, and the second walk-off element 640 are reciprocal optical elements, light entering from the reverse direct will experience the opposite optical effects as forward traversing light. The Faraday rotator 620 is a non-reciprocal device, so light entering from either direction is rotated the same direction.

Referring again to FIG. 6b, reverse traveling light from an optical fiber is represented by the labeled arrow 661 and represents light moving from right to left. The polarization of light 661 is shown in the circle 663 as having a horizontal and vertical component. It is to be understood that the reverse entering light 661 is actually unpolarized. Note also that the entering light 661 is traveling in the reverse direction to, and is at the same entry point as light beam 662 is exiting (as shown in FIG. 6a). That is, the physical position of beam 662 and 661 are coaxial and coincident. For example, if beam 662 were to be reflected by a mirror back along 662's path to the lens 660, then this reflected beam 662 would represent the direction and entry point of beam 661. Light beam 661 passes essentially unchanged through lenses 660 and 650 and exits as light 641 with polarization 643. Light 641 upon traversing through the second walk-off element 640 is split into two beams. One beam is 631 with a horizontal polarization 633. The other beam is 635 with a vertical polarization 637. These beams 631 and 635 next traverse through waveplate 630 and upon exiting the waveplate 630 are represented by beam 621 having a polarization 623, and beam 625 having a polarization 627. Light beams 621 and 625 next traverse Faraday rotator 620 a non-reciprocal optical device, and upon exiting Faraday rotator 620 entering beam 621 is now horizontally polarized 613 light beam 611, and entering light 625 is now vertically polarized 617 light beam 615. The light beams 615 and 611 enter the first walk-off element 610 and after passing through the first walk-off element 610 exit as beam 607 with vertical polarization 603, and as beam 605 with a horizontal polarization 601 respectively. Please note that the reverse optical output paths, essentially at the height of the 605 and 607 arrow are not aligned or coincident with, and are physically displaced a distance from the original input optical path at a height indicated by the arrow at 604. Thus, the reverse direction traveling light is physically displaced from the input light source and is not coupled into the input fiber thereby providing optical isolation.

Figure 7A:
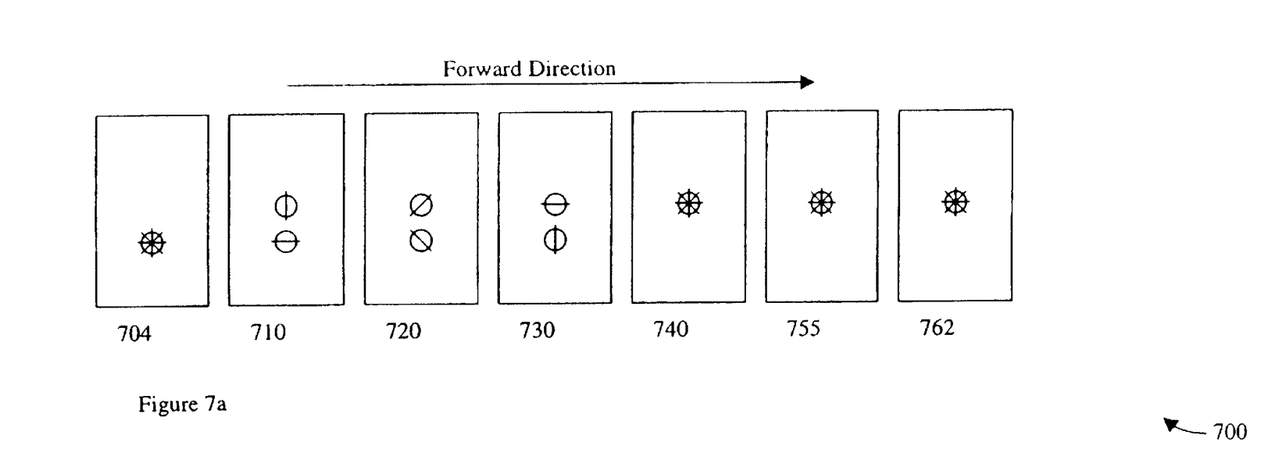
Figure 7B:
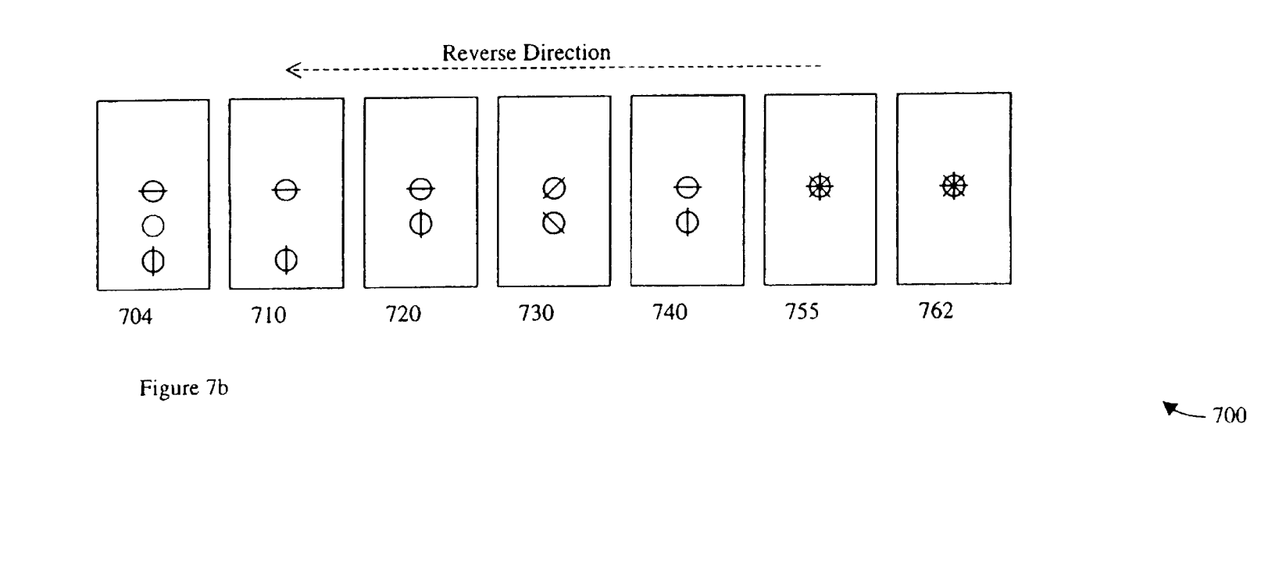
FIG. 7b illustrates an alternate representation of the operations portrayed in FIG. 6b.

FIG. 7a is a shorter alternate representation of the operations portrayed in FIG. 6a. FIG. 7b is a shorter alternate representation of the operations portrayed in FIGS. 6b. The point of view in FIGS. 7a and 7b is that of a light beam as it encounters the optical components and shows both physical locations and optical polarization after passing through the respective optical component in the direction of the light travel. In FIG. 7a, light is traveling in the forward direction (left to right) and starts as unpolarized light as indicated at 704. After passing through the first walk-off element, the light is physically separated and polarized as indicated at 710. After passing through the Faraday rotator the light is rotated as shown at 720. After passing through the waveplate, the position and polarization of the light beams is as indicated at 730. After passing through the second walk-off element the light beams are recombined and the recombined light beam is unpolarized as indicated at 740. Passing through the lens system does not alter the light as indicated at 755 and the emerging light is indicated at 762.

FIG. 7b shows light traveling in the reverse direction (right to left). Unpolarized light enters as indicated at 762 and passes through the lens system unaltered as indicated at 755. After passing through the second walk-off element, the light is physically separated and polarized as indicated at 740. After passing through the waveplate the light beams are as indicated at 730, and after passing through the Faraday rotator the light beams are as shown at 720. After passing through the first walk-off element the light beams are as indicated at 710. Reverse traveling light exits at the locations indicated as shown at 704. Note that the reverse traveling light exits at a different location than the forward traveling light (in FIG. 7a) enters. This type of shorthand diagram will be used to illustrate other embodiments.

Figure 8A:
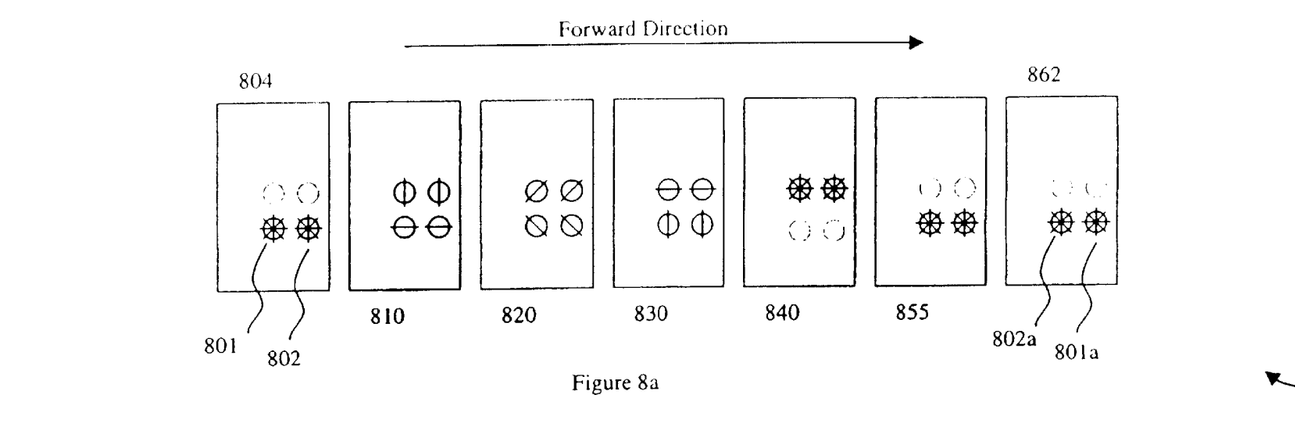
FIG. 8a illustrates spatial and optical operations for one embodiment of a dual fiber two-in-one optical isolator with light moving in the forward direction.
Figure 8B:
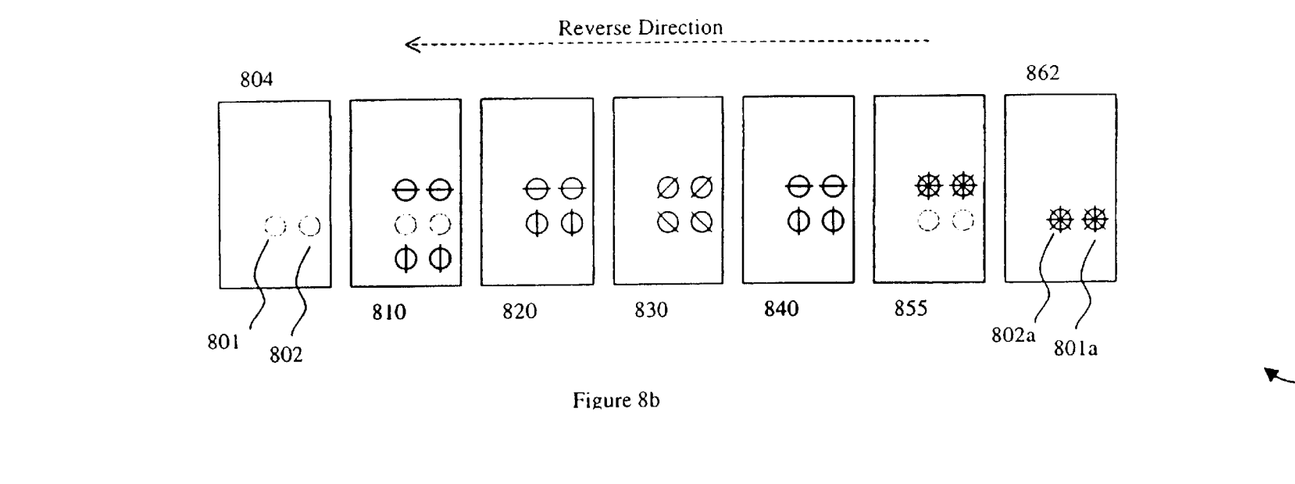
FIG. 8b illustrates spatial and optical operations for one embodiment of a dual fiber two-in-one optical isolator with light moving in the reverse direction.

FIGS. 8a and 8b illustrate the optical path of a light traveling in a forward and reverse direction respectively through a two-in-one optical isolator. Two optical cores 801 and 802 are inputs as shown at 804. The point of view in FIGS. 8a and 8b is that of a light beam as it encounters the optical components and shows both physical locations and optical polarization after passing through the respective optical component in the direction of the light travel. In FIG. 8a, light is traveling in the forward direction (left to right) and starts as unpolarized light at 804. After passing through the first walk-off element, the respective light beams are physically separated and polarized as indicated at 810. After passing through the Faraday rotator, the light beams are rotated as shown at 820. The waveplate further rotates the light beams as shown at 830. After passing through the second walk-off element, the light beams are physically recombined and again are unpolarized as indicated at 840. Passing through the lens system does not alter the light as indicated at 855, however in this example, because of the optical path through the lens system, the physical locations of the emerging light is swapped as indicated at 862. That is, input light 801 emerges at location 801a, and light beam 802 emerges at the location indicated by 802a.

FIG. 8b shows light traveling in the reverse direction (right to left). Unpolarized light from two cores enters at locations 801a and 802a as shown at 862 and passes through the lens system as indicated at 855. Again, because of the optical path through the lens system, the light beam positions are physically swapped. After passing through the second walk-off element, the light beams are physically separated and polarized as indicated at 840. The waveplate rotates the light beams as shown at 830, and after passing through the Faraday rotator the light beams are rotated as shown at 820. After passing through the first walk-off element, the light beams are physically displaced as indicated at 810. Reverse traveling light beams exit at the locations indicated as shown at 810. Note that the reverse traveling light beams exit at different locations than the forward traveling light beams enter (as shown in FIG. 8a) and thus are not coupled back to the inputs as indicated at positions 801 and 802 as shown at 804.

Figure 9A:
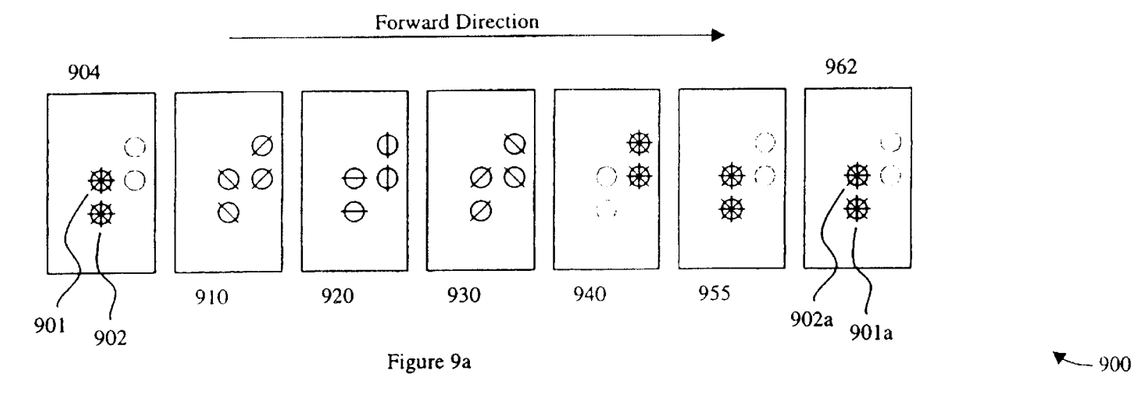
FIG. 9a illustrates spatial and optical operations for an alternative embodiment of a dual fiber two-in-one optical isolator with light moving in the forward direction.
Figure 9B:
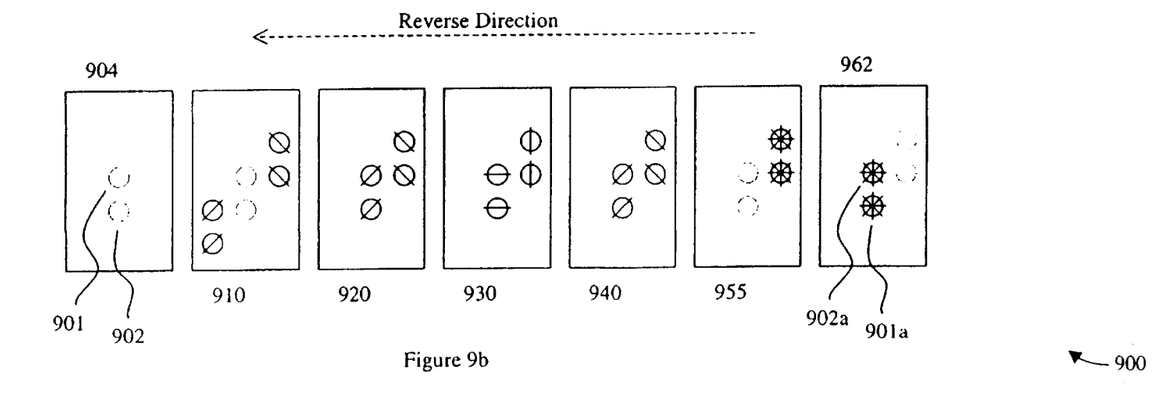
FIG. 9b illustrates spatial and optical operations for an alternative embodiment of a dual fiber two-in-one optical isolator with light moving in the reverse direction.

FIGS. 9a and 9b show an alternative embodiment of a dual fiber two-in-one optical isolator showing the light beams and the state of polarization as light travels through optical elements in the forward and reverse directions respectively. Two optical cores 901 and 902 are inputs as shown in 904. Again, the point of view is that of a light beam as it encounters the optical elements and shows both physical locations and optical polarization after passing through the respective optical element in the direction of the light travel. In FIG. 9a light is traveling in the forward direction (left to right) and starts as unpolarized light at 904 as may, for example, emanate from a multiple core fiber. After passing through the first walk-off element, the respective light beams are physically separated and polarized as indicated at 910. After passing through the Faraday rotator, the respective light beams are rotated as shown at 920. A waveplate further rotates the respective light beams as shown at 930. After passing through the second walk-off element, the respective light beams are physically recombined and again are unpolarized as indicated at 940. Passing through the lens system does not alter the respective light as indicated at 955 but because of the optical path through the lens system, swaps the physical locations of the respective emerging light as is indicated at 962. That is, light entering at 901 emerges at location 901a, and light entering at 902 emerges at the location indicated by 902a.

FIG. 9b illustrates light traveling in a reverse direction (right to left). Unpolarized light enters at locations 901a and 902a as shown at 962 and passes through the lens system as indicated at 955. Again, because of the optical path through the lens system, the light beam positions are physically swapped. After passing through the second walk-off element, the respective light beams are physically separated and polarized as indicated at 940. The waveplate rotates the respective light beams as shown at 930, and after passing through the Faraday rotator the respective light beams are rotated as shown at 920. After passing through the first walk-off element, the light beams are physically displaced as indicated at 910. Reverse traveling light beams exit at the locations indicated as shown at 910. Note that the reverse traveling light beams exit at different locations than the forward traveling light beams enter (shown in FIG. 9a) and thus are not coupled back to the inputs as indicated at positions 901 and 902 as shown at 904.

Figure 10A:
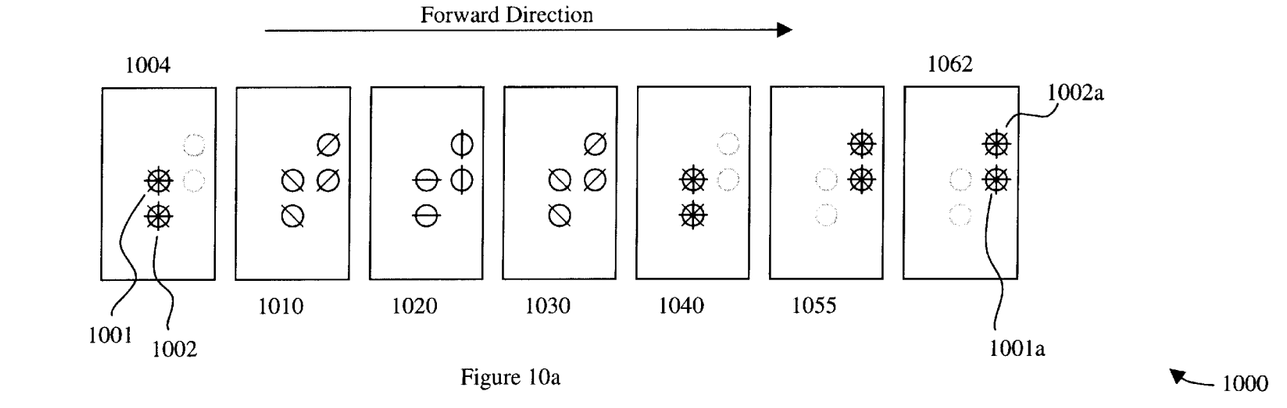
FIG. 10a illustrates spatial and optical operations for an alternative embodiment of a dual fiber two-in-one optical isolator with light moving in the forward direction.
Figure 10B:
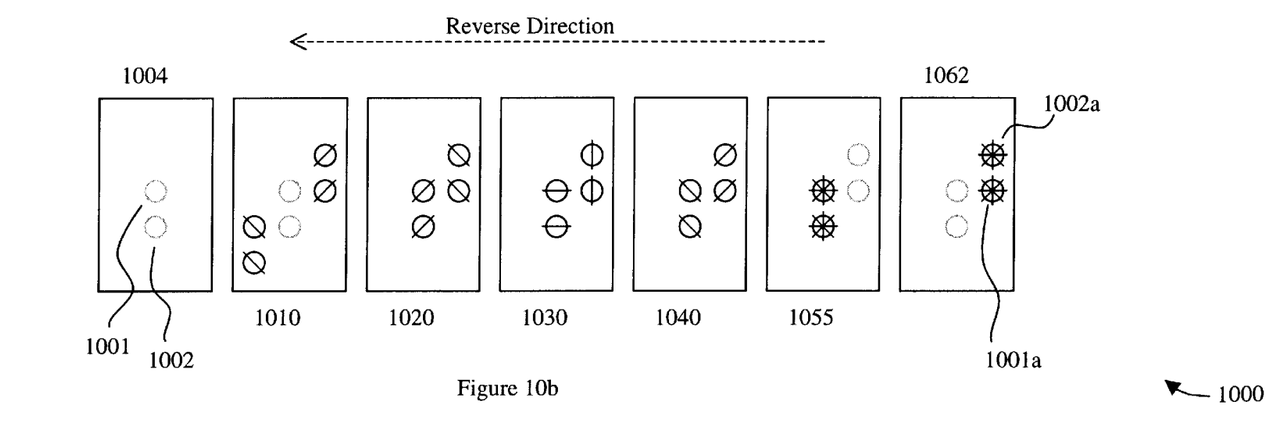
FIG. 10b illustrates spatial and optical operations for an alternative embodiment of a dual fiber two-in-one optical isolator with light moving in the reverse direction.

FIGS 10a and 10b show an alternative embodiment of a dual fiber two-in-one optical isolator showing the light beams and the state of polarization as light travels through the optical elements in the forward and reverse directions respectively. Two optical cores 1001 and 1002 are inputs as shown in 1004. Again, the point of view is that of a light beam as it traverses the optical elements and shows both physical locations and corresponding optical polarization after passing through the respective optical element in the direction of the light travel. In FIG. 10a light is traveling in the forward direction (left to right in FIG. 10a) and starts out as unpolarized light as indicated at 1004 as may, for example, emanate from a multiple core fiber. After passing through the first walk-off element, the respective light beams are physically separated and polarized as indicated at 1010. After passing through the Faraday rotator, the respective light beams are rotated as indicated at 1020. The light beams traverse through the waveplate, which further rotates the respective light beams as shown at 1030. After passing through the second walk-off element, the respective light beams are physically recombined and are unpolarized as indicated at 1040. Passing through the lens system does not alter the respective light as indicated at 1055, however, because of the optical path through the lens system, the physical locations of the respective emerging light is swapped as is indicated at 1062. That is, light entering at 1001 emerges at location 1001a, and light entering at 1002 emerges at the location indicated by 1002a.

FIG. 10b illustrates the path and polarization for light traveling in a reverse direction (right to left). Unpolarized light enters at locations 1001a and 1002a as shown at 1062 and passes through the lens system as indicated at 1055. Again, because of the optical path through the lens system, the respective light beam positions are physically swapped. After passing through the second walk-off element, the respective light beams are physically separated and polarized as indicated at 1040. The waveplate rotates the respective light beams as shown at 1030, and after passing through the Faraday rotator the respective light beams are rotated as shown at 1020. After passing through the first walk-off element, the light beams are physically displaced as indicated at 1010. Reverse traveling light beams exit at the locations indicated as shown at 1010. Note that the reverse traveling light beams exit at different locations than the forward traveling light beams enter (as shown in FIG. 10a) and thus are not coupled back to the inputs as indicated at positions 1001 and 1002 as shown at 1004.

Figure 11A:
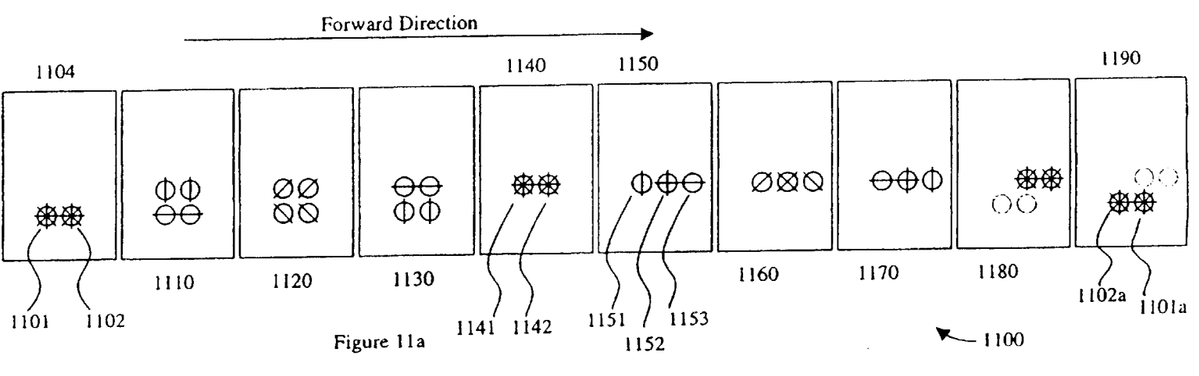
FIG. 11a illustrates spatial and optical operations for one embodiment of a two-stage dual fiber two-in-one optical isolator with light moving in the forward direction.

FIG. 11 illustrates one embodiment of a two-stage dual fiber two-in-one optical isolator showing the light beams and the state of polarization as light travels through optical elements. Two optical cores 1101 and 1102 are optical inputs as shown in 1104. The point of view is that of a light beam as it encounters the optical components and shows both physical locations and optical polarization after passing through the respective optical component in the direction of the light travel. Light is traveling in the forward direction (left to right) and starts as unpolarized light at 1104. After passing through the first walk-off element, the respective light beams are physically separated and polarized as indicated at 1110. After passing through the first Faraday rotator, the light beams are rotated as shown at 1120. The first wave plate further rotates the light beams as shown at 1130. After passing through the second walk-off element, the respective light beams are physically recombined and are unpolarized as indicated at 1140. Recombined light beam 1141 represents the light from input 1101, while that of input 1102 is represented by light beam 1142. Beams 1141 and 1142 now pass through a third walk-off element with the walk-off direction orthogonal to the walk-off direction of the second walk-off element. The respective beams passing through third walk-off element are physically separated and polarized as indicated at 1150. The vertically polarized component of light from light beam 1141 passes through the third walk-off element and is indicated at position 1151. Similarly, light beam 1142 has a vertically polarized component that passes through the third walk-off element and is represented by the vertical line at position 1152. The horizontal component of light beam 1141 is walked-off by the third walk-off element and is indicated by the horizontal line at 1152. The horizontal component of light beam 1142 is walked-off and is indicated by 1153. The beam at 1152 thus is composed of the vertically polarized component of light beam 1142, and the horizontally polarized displaced component of light beam 1141. This composition of a light beam from two sources does not alter how optical components operate. After passing through the second Faraday rotator, the light beams are rotated as shown at 1160. The second waveplate further rotates the light beams as shown at 1170. After passing through a fourth walk-off element, the light beams are recombined and again are unpolarized as indicated at 1180. Passing through the lens system does not alter the light as indicated at 1190 but because of the optical path through the lens system, swaps the physical locations of the emerging light as is indicated at 1190. That is, input light 1101 emerges at location 1101*a*, and light beam 1102 emerges at the location indicated by 1102*a*.

Figure 11B:
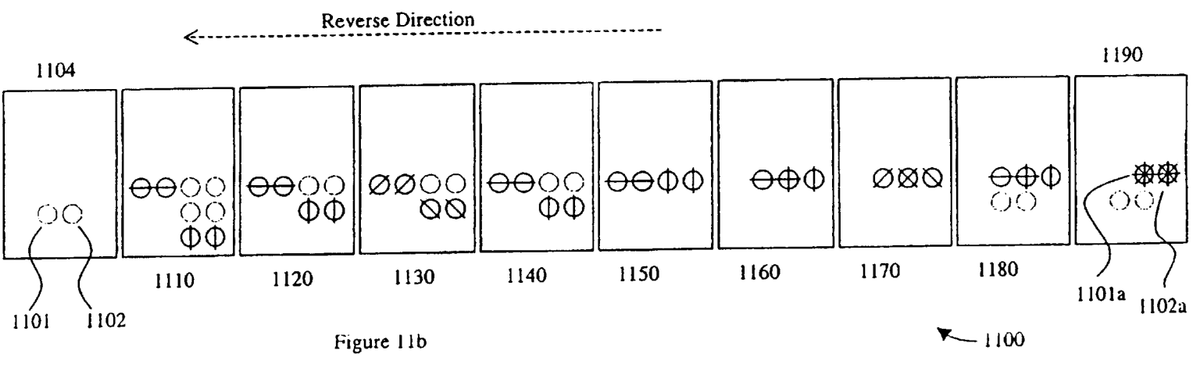
FIG. 11b illustrates spatial and optical operations for one embodiment of a two-stage dual fiber two-in-one optical isolator with light moving in the reverse direction.

FIG. 11*b* shows light traveling in the reverse direction (right to left). Unpolarized light from two cores after passing through the lens system is indicated at 1190 (which physically swaps the beam's positions) has two beams emerging at locations 1101*a* and 1102*a* as shown at 1190. After passing through the fourth walk-off element, the light beams are physically separated and polarized as indicated at 1180. Here again at 1180, there is a beam composed, as discussed above for 1152, of a horizontal and vertical component from each of the input beams. The second waveplate rotates the light beams as shown at 1170, and after passing through the second Faraday rotator the light beams are rotated as shown at 1160. After passing through the third walk-off element, the vertically polarized and horizontally polarized components of the light beams are physically displaced from each other as indicated at 1150. After passing through the second walk-off element the light beams polarization and positions are as indicated at 1140. The first waveplate rotates the light beams as shown at 1130, and after passing through the first Faraday rotator the light beams are rotated as shown at 1120. After passing through the first walk-off element, the vertically polarized light beams and horizontally polarized light beams are physically displaced such that the reverse traveling light beams exit at the locations indicated as shown at 1110. Note that the reverse traveling light beams exit at different locations than the forward traveling light beams enter (as shown in FIG. 11*a*) and thus are not coupled back to the inputs as indicated at positions 1101 and 1102 as shown at 1104.

Figure 12:
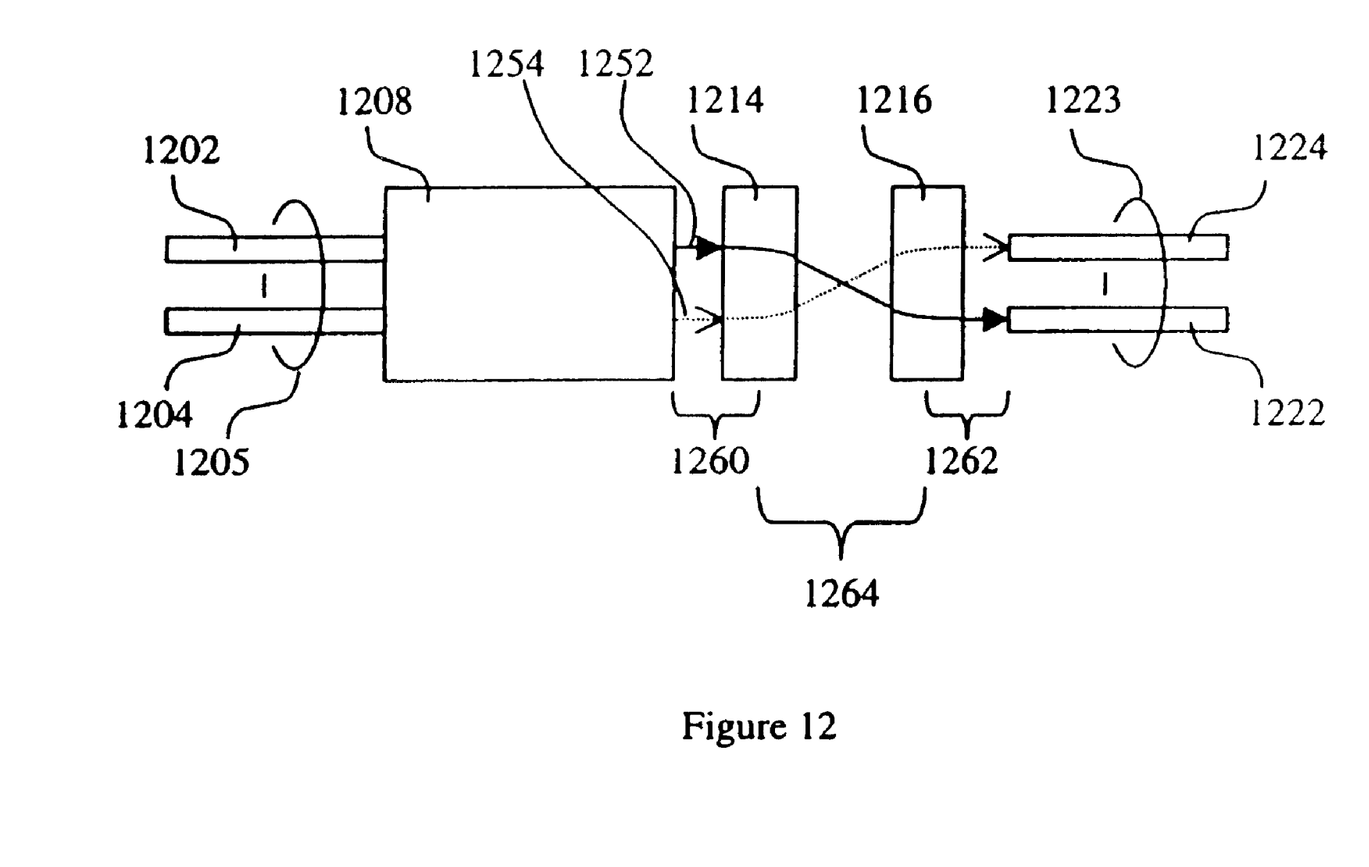
FIG. 12 illustrates in more detail one embodiment of a twin core isolator lens assembly.

FIG. 12 illustrates in more detail one embodiment of a twin core isolator lens assembly. For purposes of explanation only, FIG. 12 will be described as light traveling from left to right in the figure. It is to be understood that in actual operation light may also travel in the reverse direction. The input multiple core fiber 1205 has two cores 1202 and 1204. Input cores 1202 and 1204, are optically coupled to optical isolator elements 1208. Light received from core 1202 is denoted exiting the optical isolator element 1208 and following the path as indicated at 1252. Likewise, light received from core 1204 is denoted exiting the optical isolator element 1208 and following the path as indicated at 1254. The light exiting at 1252 follows the solid line path as indicated and enters an output core 1222 after passing through lens 1214 and lens 1216. The light exiting at 1254 follows the dotted line path as indicated and enters an output core 1224 after passing through lens 1214 and lens 1216. Cores 1222 and 1224 may be part of an output multiple core fiber 1223. Lenses 1214 and 1216 may be gradient index lenses. A gradient index lens may have plane end surfaces and has a continuous refractive index that varies with radial position.

In one embodiment of FIG. 12 using gradient index lenses for lenses 1214 and 1216, the thickness of lenses 1214 and 1216 will each be substantially in the range of 0.15 to 0.18 pitch. The distance from the optical isolator element 1208 to lens 1214 is denoted by 1260 and will be substantially the effective focal length of the lens. The distance from lens 1216 to the multiple core fiber 1223 cores 1222 and 1224 denoted by 1262 will be substantially the effective focal length of the lens. The distance between the gradient index lenses 1214 and 1216 will be substantially two times the focal length of either lens.

Thus, a method and apparatus for optically isolating multiple core fibers has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. An apparatus, comprising:
   an optical isolator;
   a first multiple core fiber coupled to the optical isolator; and
   a second multiple core fiber coupled to the optical isolator.

2. The apparatus of claim 1, wherein the optical isolator has an optically reflective element.

3. The apparatus of claim 1, wherein the optical isolator has optically transmissive elements.

4. The apparatus of claim 3, further wherein the optical isolator has no optically active reflective element.

5. The apparatus of claim 1, wherein the optical isolator has a plurality of lenses.

6. The apparatus of claim 5, wherein the plurality of lenses are gradient index lenses.

7. The apparatus of claim 1, wherein the first and second multiple core fibers are thermally expanded twin core fibers.

8. The apparatus of claim 1, wherein the first and second multiple core fibers are thermally expanded multiple core fibers.

9. An apparatus, comprising:
   an input multiple core fiber;
   an optical isolator coupled to receive inputs from the input multiple core fiber;
   a two lens focusing mechanism coupled to receive outputs of the optical isolator; and
   an output multiple core fiber coupled to receive outputs of the two lens focusing mechanism.

10. The apparatus of claim 9, wherein the two lens focusing mechanism comprises two gradient index lenses.

11. The apparatus of claim 9, wherein the two lens focusing mechanism comprises two lenses spaced substantially at a distance of two focal lengths of either lens.

12. An apparatus, comprising:
    an input optical fiber having a plurality of cores;
    a first birefringent element optically coupled to the input optical fiber;
    a non-reciprocal optical rotation mechanism optically coupled to the first birefringent element;
    a second birefringent element optically coupled to the non-reciprocal optical rotation mechanism; and
    an output optical fiber having a plurality of cores optically coupled to the second birefringent element.

13. The apparatus of claim 12, wherein the output optical fiber having a plurality of cores is optically coupled to the second birefringent element by a lens system.

14. The apparatus of claim 13, wherein the lens system comprises a plurality of lenses.

15. The apparatus of claim 14, wherein the plurality of lenses are gradient index lenses.

16. The apparatus of claim 12, wherein the non-reciprocal optical rotation mechanism comprises a latched garnet material.

17. A method of optical isolation, comprising:

receiving input signals from a multiple core fiber;

performing a first walk-off of the received input signals into separate respective polarization signals;

performing reciprocal and non-reciprocal rotation of the separate respective polarization signals;

performing a second walk-off of the separate respective polarization signals to combine the separate respective polarization signals into separate respective output signals;

focusing the separate respective output signals; and coupling the focused separate respective output signals to a receiving output multiple core fiber.

18. The method of claim 17, wherein focusing the separate respective output signals comprises:

routing the separate respective output signals through a first lens; and routing the separate respective output signals from the first lens through a second lens.

19. An apparatus for optical isolation in a multiple core fiber system comprising:

means for receiving input signals;

means for separating the received input signals into separate respective polarization signals;

means for non-reciprocal rotation of the separate respective polarization signals;

means for reciprocal rotation of the separate respective polarization signals; and means for combining the separate respective polarization signals into separate respective output signals.

20. The apparatus of claim 19, wherein the means for receiving input signals further comprises means for optically coupling a multiple core fiber to a first optical element.

21. The apparatus of claim 19, wherein the means for combining the separate respective polarization signals into separate respective output signals further comprises means for optically coupling a multiple core fiber to the separate respective output signals.

22. An apparatus for optical isolation comprising:

a multiple core input fiber;

a first birefringent crystal optically coupled to the multiple core input fiber;

a half wave plate optically coupled to the first birefringent crystal;

a Faraday rotator optically coupled to the half wave plate;

a second birefringent crystal optically coupled to the Faraday rotator;

a first gradient index lens optically coupled to the second birefringent crystal;

a second gradient index lens optically coupled to the first gradient index lens; and a multiple core output fiber optically coupled to the second gradient index lens.

23. The apparatus of claim 22, wherein the first gradient index lens and the second gradient index lens are optically separated at substantially twice the focal length of either lens.

24. An apparatus for optical isolation comprising:

a multiple core input fiber;

a first birefringent crystal optically coupled to the multiple core input fiber;

a first half wave plate optically coupled to the first birefringent crystal;

a first Faraday rotator optically coupled to the first half wave plate;

a second birefringent crystal optically coupled to the first Faraday rotator;

a third birefringent crystal optically coupled to the second birefringent crystal;

a second half wave plate optically coupled to the third birefringent crystal;

a second Faraday rotator optically coupled to the second half wave plate;

a fourth birefringent crystal optically coupled to the second Faraday rotator;

a first gradient index lens optically coupled to the fourth birefringent crystal;

a second gradient index lens optically coupled to the first gradient index lens; and a multiple core output fiber optically coupled to the second gradient index lens.

25. The apparatus of claim 24, wherein the second birefringent crystal fast optical axis is at a predetermined angle with respect to the third birefringent crystal fast optical axis.

26. The apparatus of claim 25, wherein the predetermined angle is substantially 90 degrees.

27. The apparatus of claim 25, wherein the predetermined angle is substantially 45 degrees.

28. An apparatus for optical amplification in a multiple core fiber system, comprising:

means for receiving a first input signal originating from a first core of a first multiple core fiber;

means for separating the first input signal into separate first polarization signals;

means for non-reciprocal rotation of the separate first polarization signals;

means for reciprocal rotation of the separate first polarization signals;

means for combining the separate first polarization signals into a first output signal;

means for coupling the first output signal to an input of an optical amplifier;

means for receiving the optical amplifier output signal as a second input signal;

means for separating the second input signal into separate second polarization signals;

means for non-reciprocal rotation of the separate second polarization signals;

means for reciprocal rotation of the separate second polarization signals;

means for combining the separate second polarization signals into a second output signal; and means for coupling the second output signal to a second core of a second multiple core fiber.

29. The apparatus of claim 28, wherein the first multiple core fiber and second multiple core fiber are the same multiple core fiber.

30. The apparatus of claim 28, wherein the input of the optical amplifier, the optical amplifier, and the optical amplifier output share a common fiber core.

31. The apparatus of claim 28, wherein the means for non-reciprocal rotation of the separate first polarization signals followed by the means for reciprocal rotation of the separate first polarization signals may be performed as means for reciprocal rotation of the separate first polarization signals followed by means for non-reciprocal rotation of the separate first polarization signals.

32. An apparatus, comprising:

a first multiple core fiber;

an optical isolator coupled to the first multiple core fiber;

a two lens assembly coupled to the optical isolator; and a second multiple core fiber coupled to the two lens assembly.

33. The apparatus of claim 32, wherein the two lens assembly comprises:

a first optical element;

a second optical element;

a first lens spaced substantially one focal length of said lens from the first optical element;

a second lens spaced substantially one focal length of said lens from the second optical element; and the first lens and the second lens spaced substantially two focal lengths of either of said lenses from each other.

34. The apparatus of claim 33, wherein the first lens and the second lens are gradient index lenses.

35. The apparatus of claim 34, wherein the gradient index lenses are equal to or less than one-fourth pitch each in thickness.

* * * * *